April 24, 1945.   A. MORCH   2,374,371
APPARATUS FOR THE ANIMATING OF PICTURES AND THE LIKE
Filed Feb. 10, 1943
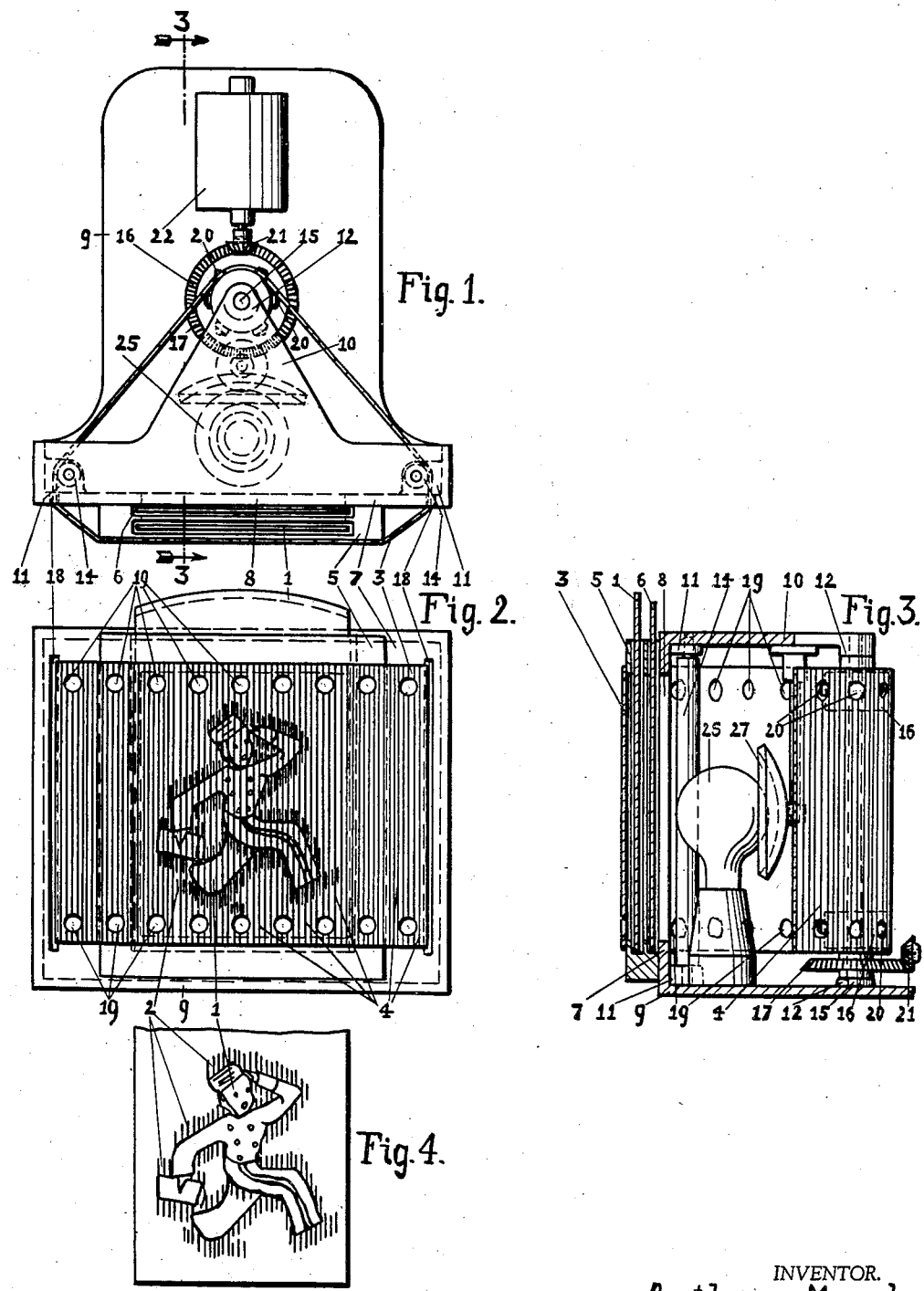
INVENTOR.
Anthony Morch
BY Henry J. E. Metzler
Agt.

Patented Apr. 24, 1945

2,374,371

UNITED STATES PATENT OFFICE 2,374,371

APPARATUS FOR THE ANIMATING OF PICTURES AND THE LIKE

Anthony Morch, Brooklyn, N. Y.

Application February 10, 1943, Serial No. 475,360

1 Claim. (Cl. 88—16)

My invention relates to improvements in apparatus for the animating of not-moving pictures, photographs, figures, letters, and the like, so as to impart an appearance of life or movement to not-moving images and to attract the attention by producing an impression of movement on the onlooker.

The objects of my improvements are as follows:

First, the provision of a simple and inexpensive apparatus by means of which any pictures, letters, figures, or the like—after a simple preparation—can be made to appear as if they were moving;

Second, to provide in the most simple and inexpensive manner an unusual, surprising effect for advertising, display, entertainment, toy, or amusement purposes, such as hitherto has never been attained by non-moving pictures, signs, or the like;

Third, to provide a possibility for the projecting of non-moving images upon a screen where these images appear as moving images.

As as example, one specific form of the apparatus especially adapted for carrying out the invention is illustrated in the accompanying drawing, in which—

Fig. 1 is a plan view of the apparatus previously referred to;

Fig. 2 is a front elevation of said apparatus with a picture on it prepared in accordance with the present invention;

Fig. 3 is a sectional view of said apparatus, partially broken away, on the lines 3—3 of Fig. 1; and Fig. 4 is an image prepared in accordance with the present invention.

Similar numerals refer to similar parts throughout the several views.

In carrying out my improved process I prefer to proceed as follows: I provide a picture, sign, or the like—the picture 1 of a messenger boy in the present instance—at the contours with parallel lines 2, as may be seen in Figs. 2 and 4; parts of the image which should primarily appear as moving parts, for instance the feet of the running messenger, may be indicated entirely by parallel faint lines 2. Then I provide a piece of transparent material—a belt 3 in the present instance—with parallel lines 4 (Figs. 2 and 3), which have the same direction as the parallel faint lines 2. If then the transparent piece 3 is moved across the image, the lines 4 on the piece 3 will alternately cover the lines 2 so that the lines 2 disappear beneath the lines 4, and in the next moment the lines 2 will reappear, which produces the optical effect of life or movement.

The same effect will be attained if the transparent piece 3 is kept unmoveable and if the prepared image 1 is moved below the transparent piece 3. If the picture 1 is transparent the piece 3 may be moved over or behind the picture 1.

If the lines 2 and 4 are vertical, as in the instance shown, and if the transparent piece 3 is moved horizontally across the image 1, an appearance of a horizontical movement will be attained. If the lines 2 and 4 are horizontical the movement will appear as vertical or up and down movements.

I prefer to use an apparatus as shown in Figs. 1 to 3 inclusive. The main part of this apparatus is a frame 5, which is adapted to receive a picture 1 or a sign, an advertisement, or the like, and an interchangeable transparent plate 6, which may be of colored glass so that one and the same picture may be shown in various colors. The frame 5 is carried by a wall 7 having an aperture 8 and being supported by a base plate 9. A top plate 10, which is secured to the wall 7, and the base plate 9 carry bearings 11 and 12. Rollers 14 turn in the bearings 11; and a shaft 15, carrying two disks 16 and a bevelled wheel 17, turns in the bearings 12. The transparent belt 3, previously referred to, extends through slots 18 in the wall 7, and is provided with perforations 19 which are adapted to engage pins 20 secured to the circumference of the disks 16, so that—if the shaft 15 and the disks 16 revolve—the belt 3 moves across the frame 5 and the image 1. The shaft 15 and the disks 16 can be turned by means of the bevelled wheel 17, which engages a bevelled pinion 21 which is driven by a motor 22.

My device can be used indoors and outdoors Whereas normally in day-light no illumination of the image 1 is necessary, I prefer to increase the effect by illuminating it by means of a lamp 25 behind the picture, provided the picture is transparent or is on any thin material such as paper or thin cardboard. I prefer also to increase the effect of the lamp 25 by means of a reflector 27, which may be secured to the top plate 10. If a transparent inverted picture is used, the image can be projected upon a screen and can be magnified by projector lenses not shown.

The picture 1 itself can be produced by projecting an image of an object upon a screen (not shown) by means of a source of light, by drawing the image thus projected on said screen by tracing the projected lines on the screen by means of a piece of chalk or by means of a soft pencil, and by drawing parallel lines 2 around the contours of the image.

While there has been shown and described and pointed out the fundamental novel features of the invention as applied to a single modification, it will be understood that various omissions and substitutions and changes may be made by those skilled in the art without departing from the spirit of the invention. It is the intention, therefore, to be limited only as indicated by the scope of the following claim:

What I claim and wish to secure by Letters Patent of the United States is:

Apparatus for animating pictures and the like comprising a base plate, a frame rectangularly secured to said base plate, a top plate rectangularly secured to the upper portion of said frame, a shaft perpendicularly arranged between said base and top plates in spaced relation to said frame and carrying disks which are provided with pins radially extending from the circumference of said disks, means for rotating said shaft, a source of light arranged between said shaft and said frame and being provided with means for reflecting light toward said frame, a transparent belt provided with vertical parallel lines and having perforations adapted to engage the pins of said disks, and means for guiding said transparent belt across said frame in a horizontal direction, said frame being adapted to receive an image the contours of which are provided with lines that are parallel to the lines on said belt, substantially as described.

ANTHONY MORCH.